June 20, 1967     H. G. BRAENDEL     3,326,561
PISTON RING ASSEMBLY
Filed June 29, 1964
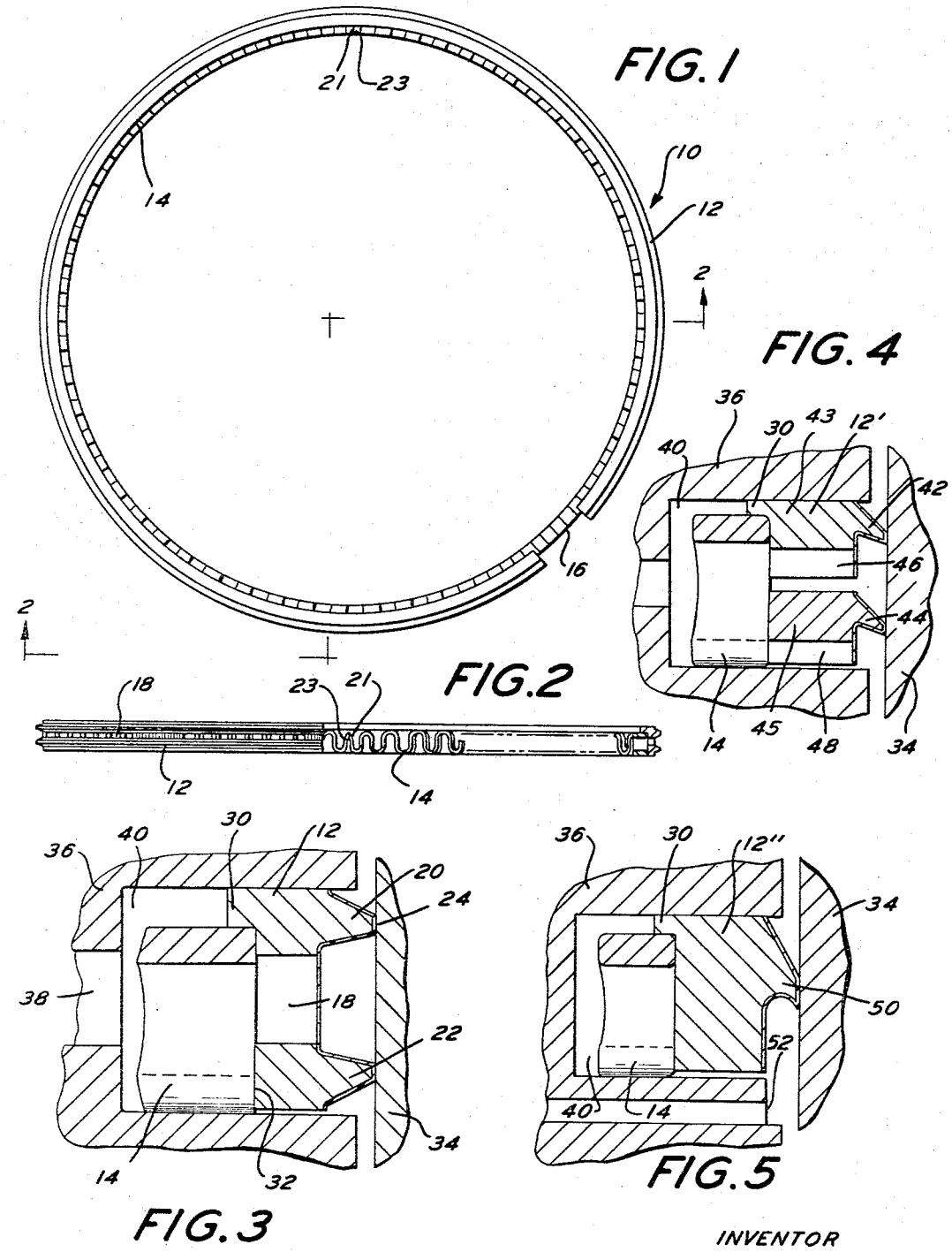
INVENTOR
HELMUTH G. BRAENDEL
BY Seidel & Gonda
ATTORNEYS.

United States Patent Office 3,326,561
Patented June 20, 1967

3,326,561
PISTON RING ASSEMBLY
Helmuth G. Braendel, Malvern, Pa., assignor, by mesne assignments, to Gould-National Batteries, Inc., St. Paul, Minn., a corporation of Delaware
Filed June 29, 1964, Ser. No. 378,880
4 Claims. (Cl. 277—141)

This invention relates to a novel piston ring assembly for use in the ring-receiving grooves of pistons of internal combustion engines and the like.

There are basically two types of piston rings. These include compression rings and oil rings.

The essential purpose of a compression ring is to provide a positive seal between the piston and cylinder wall and between the ring and the sides of the ring groove in the piston. It must do this quickly and effectively, and then maintain the seal for long life. When this is not accomplished, raw fuel and gases under high pressure blow by the ring, wasting power, destroying lubrication and setting up immediate wear which may lead to scuffing and scoring of the cylinder walls.

The essential function of an oil ring is not to scrape oil, but to meter a very thin and uniform film of oil to the compression ring belt. The oil film must be such as will most efficiently lubricate against wear, provide a seal between the face of the compression rings and the cylinder wall, transfer combustion heat quickly through the cylinder walls to the engine coolant, and in some cases provide an oil drainage passage to the interior of the piston. The oil ring must meter the oil along the entire stroke of the piston, and against a surface which is never truly round or truly straight. All cylinders, whether new or worn, are subject to some degree of distortion induced by thermal or structural causes. Therefore, an oil-control ring which is to meter such a film of oil to the compression ring belt must be flexible enough to conform to variations from perfect shape with little change in pressure around the entire circumference.

If the oil ring does not accomplish its function, it will scrape excessively along those sections of the cylinder which distort inwardly and will meter too much oil along such sections of the cylinder as distort outwardly. This lack of ability to conform to changes in contour of the cylinder walls, therefore, tends to induce scuffing and at the same time permits excessive consumption of oil.

If the oil ring also contains a drainage passage to the interior of a piston, there is a possibility that oil admitted to the piston ring groove can leak back to the cylinder wall from above the oil ring if it is not tightly sealed against the top of the piston groove. If this happens, an excessive amount of lubricating oil is presented to the compression ring belt. This not only results in excessive consumption of oil, but increases the chance of blow-by. Further, if blow-by does occur, the oil leaked to the cylinder walls will become contaminated.

Accordingly, it is an object of this invention to disclose a piston ring assembly.

Another object of this invention is to disclose a piston ring assembly whose cylinder-contacting periphery or peripheries have a high degree of flexibility or conformability so as to enable them to maintain full contact with the cylinder wall throughout the peripheries, regardless of changes in contour of the cylinder wall.

A still further object of this invention is to disclose a piston oil control ring assembly which is maintained in sealing engagement with the top of its piston groove at all times to prevent oil leakage back to the cylinder walls and the compression rings.

Other objects will appear from the disclosure which follows hereinafter.

For the purpose of illustrating the invention, there are shown in the drawings forms which are presently preferred; it being understood, however, that this invention is not limited to the precise arrangements and instrumentalities shown.

FIGURE 1 is a top plan view of a piston ring assembly constructed in accordance with the present invention.

FIGURE 2 is a cross sectional view taken substantially along the plane indicated by the line 2—2 of FIGURE 1.

FIGURE 3 is an enlarged detailed sectional view of the extreme righthand portion of the piston ring illustrated in FIGURE 2, said ring being shown mounted within a piston groove and in contact with a cylinder wall.

FIGURE 4 is a view similar to FIGURE 3 but illustrating another embodiment of a piston ring assembly constructed in accordance with the principles of the present invention.

FIGURE 5 is a view similar to FIGURE 3 but illustrating still another embodiment of a piston ring assembly constructed in accordance with the principles of the present invention.

The piston ring assembly of the present invention is generally designated by the numeral 10. The piston ring assembly 10 includes a rail 12 and a corrugated expander ring 14.

The rail 12 is split as shown at 16 so that it can be mounted in a piston groove. The expander ring 14 is generally annular, resilient, compressible, and sinusoidally corrugated. The expander ring 14 is interrupted at one point along its circumference to form freely abutted end portions 21 and 23 at the point of interruption. If desired, the end portions 21 and 23 may be connected together by pinning or interlocking as is well known in the art.

The rail 12 includes a pair of axially spaced radially outwardly extending annular projections 20 and 22. Each of the projections 20 and 22 terminate in a cylinder wall engaging surface 24.

The rail 12 is also provided with a radially inwardly extending annular lip 30 having as one of its sides a portion of the rail top surface. The portion of the rail 12 beneath the lip 30 includes an annular surface 32 spaced radially outwardly from the radially inwardly terminal portion of the lip 30.

The piston ring assembly 10 is adapted to serve as an oil control ring. It is provided with circumferentially spaced oil drainage passages 18.

With specific reference to FIGURE 3, the assembly of the piston ring 10 will now become apparent. The expander ring 14 is placed in a piston groove 40 in a piston 36. The end portions 21 and 23 are placed in abutting engagement. The rail 12 is then positioned in the piston groove 40 by placing the expander ring 14 beneath the radially inwardly extending lip 30 on the rail. The expander ring 14 will thus be in abutment with the surface 32 as well as the lower surface of the lip 30.

The expander ring 14 will be compressed along its periphery, when the rail 12 surrounding it is compressed in conformance with the cylinder diameter. The expander ring 14 acts as an unstable column, snaking from side to side.

The axial force of this snaking action will be exerted between the lower side of the piston groove 40 and the lip 30, thereby holding the top of the rail 12 in intimate contact with the upper side of the piston groove.

The expander ring 14 is also dimensioned so that when the ends 21 and 23 abut, the diameter of the ring 14 is slightly greater than the diameter of the annular abutment surface 32. The expander ring 14 will thus be circumferentially compressed to exert an outward radial force upon the rail 12 to urge the cylinder wall engaging surfaces 24 into intimate contact with the cylinder 34.

Due to the outward radial urging of the expander ring 14 and the flexibility of the rail 12 because it is split, a force is exerted on the rail to urge it to conform to the contour of the cylinder wall. This is especially true in view of the fact that the expander ring 14 is sinusoidally corrugated whereby a uniform radially outward force is applied to the rail when the expander ring is compressed. Further, due to the snaking action of the expander ring 14, axial force is exerted against the lip 30 to insure that the top of the rail 12 is in sealing engagement with the top of the piston groove. Because of this, oil scraped from the cylinder walls will flow through the oil drainage passages 18, through the corrugated expander ring 14, and into the piston oil passage 38. Oil flowing into the interior of the piston groove 40 will be prevented from leaking past the top of the rail 12 back to the cylinder and the compression rings.

FIGURE 4 illustrates a similar piston ring assembly, except that the rail 12' is slightly different in construction. Hence, similar numerals have been employed which designate similar elements as with the embodiment of the invention illustrated in FIGURES 1–3.

The rail 12' is formed in two pieces 43 and 45. The rail 12' forms a part of an oil control piston ring assembly and has a pair of axially spaced projections 42 and 44 which are slightly beveled. Drainage passages are provided under both projections 42 and 44 as illustrated at 46 and 48. This rail is designed to provide maximum oil drainage in all types of piston grooves.

FIGURE 5 illustrates still another rail 12''. Corresponding elements in the piston ring assembly illustrated in FIGURE 5 are designated by similar numerals as those used in conjunction with the embodiments in FIGURES 1–3 and 4. The rail 12'' combines both compression and oil control functions. The rail 12'' includes a directionally beveled rail projection 50 for engaging the cylinder walls. There is no drainage area in the ring itself so it is especially effective in controlling blow-down in two cycle engines, as well as providing supplementary oil control. In order for this ring to function as a blow-down sealing ring, a drain hole 52 is provided in the piston 36 below groove 40.

The cylinder wall engaging surfaces on each of the rails may be chrome plated. This provides for a long wearing surface which is practically scuffless and increases ring life up to four times. The rate of wear of the cylinder wall and of the other rings will be reduced also. The chrome plating has also been found to withstand high temperatures, abrasion and corrosion.

The present invention may be embodied in other specific forms without departing from the spirit or essential attributes thereof and, accordingly, reference should be made to the appended claims, rather than to the foregoing specification as indicating the scope of the invention.

I claim:

1. A composite multi-piece piston-ring assembly for use in and with the cylinder and piston of internal combustion engines and the like wherein the piston includes an annular groove, said piston ring assembly comprising a generally annular split rail, said rail having a top surface for establishing intimate contact with the top of said piston groove, at least one radially outwardly extending circumferential projection on said rail terminating in a cylinder wall engaging surface, a radially inwardly extending circumferential lip on said rail having as one of its sides a portion of said rail top surface for establishing intimate contact with the top of said piston groove, said lip having as the other of its sides a planar surface parallel to said one of its sides, said rail further including an inwardly facing annular surface disposed beneath said lip and spaced radially outwardly from the radially inward terminal portion of said lip, a generally annular compressible corrugated resilient expander ring beneath said lip in abutment with said other of its sides and said annular surface and in operative abutment with the bottom of said piston groove, said ring being interrupted at one point along its circumference and having abutted end portions at said point of interruption when said composite piston ring assembly is operatively mounted in a ring-receiving groove of a piston.

2. A composite piston ring assembly for use in and with the cylinder and piston of internal combustion engines and the like wherein the piston includes an annular groove, said piston ring assembly comprising a generally annular split rail, said rail having a top surface for establishing intimate contact with the top of said piston groove, at least one radially outwardly extending circumferential projection on said rail terminating in a cylinder wall engaging surface, a radially inwardly extending circumferential lip on said rail having as one of its sides a portion of said rail top surface for establishing intimate contact with the top of said piston groove, said lip having as the other of its sides a downwardly facing planar surface, said rail further including an inwardly facing annular surface disposed beneath said lip and spaced radially outwardly from the inward terminal portion of said lip, and resilient compressible means beneath said lip and in abutment with said downwardly facing planar surface and said annular surface and in operative abutment with the bottom of said piston groove for urging said rail portion beneath said lip radially outwardly so that said cylinder wall engaging surface can conform to changes in contour of said cylinder wall and said lip and rail top surface axially upwardly into sealing contact with the top of a piston groove when operatively assembled in said groove.

3. A piston ring assembly in accordance with claim 2 wherein said rail includes separable top and bottom portions, and a plurality of circumferentially spaced oil drainage passages through each of said top and bottom rail portions.

4. Apparatus comprising a cylinder, a piston reciprocably mounted within said cylinder, an annular groove within said piston, a composite piston ring assembly within said piston groove, said piston ring assembly comprising a generally annular split rail, said rail having a top surface in sealing engagement with the top side of said piston groove, at least one radially outwardly extending circumferential projection on said rail terminating in a cylinder wall engaging surface, a radially inwardly extending circumferential lip on said rail, having as one of its sides a portion of said rail top surface in sealing engagement with the top side of said piston groove, said lip having as the other of its sides a downwardly facing surface, said rail further including an inwardly facing surface disposed beneath said lip and spaced radially outwardly from the radially inward terminal portion of said lip, a generally annular compressible corrugated resilient expander ring beneath said lip in abutment with said downwardly facing surface and inwardly facing surface of said rail beneath said lip and in operative abutment with the bottom of said piston groove, said ring being interrupted at one point along its circumference and having abutted end portions at said point of interruption when said composite piston ring assembly is operatively mounted in the ring-receiving groove of said piston.

References Cited

UNITED STATES PATENTS

| 3,202,430 | 8/1965 | Braendel | 277—141 |
| 3,228,704 | 1/1966 | Hamm | 277—138 |

LAVERNE D. GEIGER, *Primary Examiner.*

SAMUEL ROTHBERG, D. MASSENBERG,
*Assistant Examiners.*